United States Patent
Dale et al.

[15] 3,676,358
[45] July 11, 1972

[54] ATOMIZING, SPRAY-DRYING AND FLAME PROCESS FOR MANUFACTURING PHOSPHORS

[72] Inventors: Ernest A. Dale, Hamilton; Martha J. B. Thomas, Winchester, both of Mass.

[73] Assignee: Sylvania Electric Products Inc.

[22] Filed: Jan. 2, 1970

[21] Appl. No.: 422

[52] U.S. Cl. ................................................. 252/301.4 P
[51] Int. Cl. ........................................................... C09k 1/36
[58] Field of Search ................. 252/301.4, 301.4 P, 301.6, 252/301.6 P, 301.5

[56] References Cited

UNITED STATES PATENTS

| | | | |
|---|---|---|---|
| 3,538,014 | 11/1970 | Wachtel | 252/301.4 P |
| 3,030,313 | 4/1962 | Alles | 252/301.4 P |
| 3,291,747 | 12/1966 | LeFever et al. | 252/301.4 R |
| 3,305,349 | 2/1967 | Bovarnick et al. | 75/.5 |
| 3,378,335 | 4/1968 | Ellis et al. | 252/62.56 |

*Primary Examiner*—Robert D. Edmonds
*Attorney*—Norman J. O'Malley and James Theodosopoulos

[57] ABSTRACT

Phosphor raw ingredients are homogeneously dispersed or dissolved in a liquid which is then spray dried to form particles having a predetermined particle size range, each particle containing substantially identical proportions of the raw materials. The particles are then passed through a flame in order to react the particles to form phosphor matrices.

10 Claims, No Drawings

ATOMIZING, SPRAY-DRYING AND FLAME PROCESS FOR MANUFACTURING PHOSPHORS

BACKGROUND OF THE INVENTION

1. Field of the Invention

This invention relates to an improved method for the manufacture of a phosphor matrix and, more particularly, to the manufacture of a fluorescent lamp phosphor, such as a halophosphate.

2. Description of the Prior Art

Halophosphate phosphors are well known in the prior art and are extensively used in fluorescent lamps. Such phosphors are described in U.S. Pat. No. 2,488,733 issued on Nov. 22, 1949.

Halophosphate phosphors can be represented by the general matrix $3M_3(PO_4)_2 \cdot MH_2$, where M represents either different or identical bivalent metals or mixtures of such metals, for example, calcium, strontium or barium, and H represents a halogen or mixture of halogens, preferably, fluorine, chlorine or bromine.

Previous methods for preparing a halophosphate phosphor matrix involved weighing out the raw materials in fixed proportions and then blending them by dry mechanical mixing or by wet ball milling followed by drying. As pointed out in a co-pending application, Ser. No. 606,159 entitled "Process for Forming Phosphors," filed on Dec. 30, 1966 by Dale et al, such blending methods did not generally produce the desired homogeneity in the phosphor matrix.

In the usual procedure the mixture was then placed in trays or boats and fired at about 800° to 1,300° C. in the batch furnaces to yield a phosphor. The firing generally lasted about 1 or 2 hours, that length of time necessary to result in complete conversion to the phosphor matrix and eliminate the volatiles in the material.

Such batch firing usually resulted in undesirable agglomeration of the phosphor particles. Since the agglomerated particles were too large to produce an efficient uniform phosphor coating, milling or grinding was necessary to reduce the size of the phosphor particles to a size suitable for a phosphor coating. Consequently, after milling or grinding, the powder would often have to be classified in order to obtain a desired particle size range.

Another disadvantage to the batch method of firing is non-uniformity of rate of heating of the powder within a boat which can cause an undesirable variation of the phosphor composition within a batch.

SUMMARY OF THE INVENTION

In the manufacture of phosphors in accordance with this invention, predetermined quantities of phosphor raw materials are dissolved and/or dispersed in a suitable liquid vehicle, usually water.

In soluble materials are entered into the liquid vehicle in a sufficiently fine particle size so as to permit the maintenance of a homogeneous dispersion thereof throughout the liquid.

The homogeneous solution/dispersion is then atomized into a spray drier to yield particulate material having a predetermined particle size range, as shown in co-pending application, Ser. No. 606,159, now abandoned. The dried material is then transported by means of a gaseous medium, such as air, into a flame within a chamber under conditions sufficient to heat the material and cause it to chemically react and be converted to a phosphor matrix. During conversion, the particles are in sufficiently continuous motion to prevent substantially any sintering together or agglomeration thereof. The phosphor is then separated from the exhaust and transport gases and is collected in a suitable container.

In some cases it may be desirable to heat the particles in the flame to a temperature higher than the minimum conversion temperature in order to melt part or all of each particle. Such melting can cause the particles to assume a substantially circular or spherical shape, which shape improves phosphor packing density when the phosphor is deposited on a fluorescent lamp envelope.

The temperature to which the particles are heated in the flame can be controlled by, inter alia, the type of fuel that is burned, the rate and velocity at which the particles are introduced into the flame and the type of gas used to pneumatically transport the particles into the flame. In addition the flame can be made oxidizing or reducing by varying the ratio of fuel to combustion supporting gas below or above the stoichiometric ratio.

DESCRIPTION OF THE PREFERRED EMBODIMENTS

A solution was prepared by mixing together the following materials:

|  | Specific Gravity | Grams of Solution |
| --- | --- | --- |
| Calcium Nitrate Solution | 1.300 | 1,528 |
| Strontium Nitrate Solution | 1.256 | 78,000 |
| Magnesium Nitrate Solution | 1.256 | 6,030 |
| Phosphoric Acid | 1.522 | 11,130 |

To the above solution were added 240 grams of tin oxide powder having a particle size less than 3 microns. Homogeneity of the resultant solution/dispersion was maintained by constant agitation thereof.

In this example, the tin could have been introduced into the original solution in a solution form itself, instead of as finely divided tin oxide, by first dissolving the tin oxide in hot phosphoric acid.

The homogeneous solution/dispersion was then atomized and spray dried, as described in Ser. No. 606,159, at a rate of about 270 cc./minute in a stream of air at a temperature of about 400° F. The resultant particles, which at this point were a tin-containing nitrated alkaline earth phosphate, were then pneumatically transported in a stream of air into a flame jet of natural gas and air at the upper end of a tall tubular chamber.

The flame apparatus consisted of three vertical concentric tubes leading into the upper end of the chamber. The particles of powder were introduced therein through the innermost tube, the diameter of which was three-fourth inch, at a rate of 40 pounds per hour with a transport gas (air) rate of 625 cubic feet per hour. Natural gas was introduced through the intermediate tube, the diameter of which was 1⅝ inches. Air was introduced through the outermost tube, the diameter of which was 4½ inches, at a rate of 2,000 cubic feet per hour, but the air entered the chamber through eight 0.30 diameter nozzles which extended three inches below the powder and natural gas inlets. This 3 inch extension, together with the close proximity of the powder and natural gas inlets, permitted the powder to mix thoroughly with the natural gas before the powder entered the flame region. An electric arc ignition was disposed within the chamber to initially ignite the gas-air mixture.

The flame region started slightly below the nozzles, where the natural gas and air started to mix, and extended downward about 2 to 3 feet, filling substantially the entire cross-sectional area of the chamber. Thus, substantially all the particles had to pass through the flame in their path downward through the chamber.

A heat resistant ceramic tube, 5 inches diameter by 9 inches long, surrounded the inlet pipes and nozzles, and extended several inches below the nozzles. The purpose of the tube was to promote turbulent flow of the gases and powder and, therefore, insure thorough mixing thereof. Also, such turbulent flow reduced the likelihood of particle agglomeration by substantially preventing intimate contact between particles as they passed through the flame.

In order to further improve the thorough mixing of the natural gas and air, for the purpose of improving uniformity in the flame temperature, the nozzles were rotated at a rate of 10 revolutions per minute. This rotation also helped prevent sticking and buildup of hot particles on the walls of the hot ceramic tube.

The chamber consisted of a vertical ceramic cylinder, 16 inches diameter by 16 feet high. As the converted particles dropped to the bottom of the chamber, they were collected in a container of water in order to separate them from the exhaust gases. In addition, the exhaust gases were passed through a cyclone separator to recover particles carried out with the gases. The collected particles were then centrifuged to separate them from the water and then dried, to yield a free flowing powder.

In this particular example, the powder was not yet a phosphor (that is, capable of fluorescing) since the tin activator was not in its reduced state (+2 valence) but was in its oxidized state (+4 valence). This occurred even though the ratio of air to gas (8.75 to 1) was below the stoichiometric ratio (10 to 1) and thus yielded a reducing flame. The reason for this is that the products of the conversion reaction, mainly $NO_2$ and $H_2O$, were sufficiently oxidizing to prevent complete reduction of the tin activator. Therefore, the converted powder was again passed through the flame jet under the same conditions and, in the absence of conversion reaction gases, the phosphor was activated by reduction of the tin.

It is felt that the addition of a strong reducing gas, such as hydrogen, to the flame jet may overcome the oxidizing effect of the reaction gases and obviate the need of a second firing to reduce the tin.

In the case of some phosphors, for example, europium activated yttrium vanadate, the spray-dried particles need not be fired in a reducing atmosphere to convert the powder to a phosphor; in such a case, the ratio of air to gas could be at the stoichiometric ratio, or even slightly greater, to yield an oxidizing atmosphere. In this example, the reaction gases would not interfere with the activation of the phosphor.

A tin-activated calcium strontium magnesium orthophosphate phosphor, prepared in accordance with this invention, was used in the manufacture of 40 watt fluorescent lamps, which were compared with lamps coated with prior art processed phosphor. Optimum lamp phosphor density required only 4.98 grams of the instant phosphor as against 7.5 grams of the prior art phosphor, a significant cost-saving reduction of 34 percent of phosphor material.

The lumen output of the instant-phosphor lamp at 0 and 100 hours was 2,058 and 1,978 lumens, respectively, for a maintenance of 96.2 percent. For the prior-art-phosphor lamp, the same figures were 2,031 and 1,882 lumens for a maintenance of only 92.7 percent.

It is felt that the improvements in phosphor density and maintenance of phosphors manufactured in accordance with this invention are due to greater uniformity in the conversion reaction, a more closely controlled particle size distribution and greater homogeneity in the final phosphor.

In some cases it may be desirable to introduce a volatile species into the flame that is an essential element of the finished phosphor and which will directly enter into the conversion reaction. For example, hydrogen chloride or ammonium chloride could be introduced into the transport gas in the case of some chlorophosphate phosphors, instead of including the chloride in the spray dried material. This would be particularly applicable where a species necessary to produce the finished phosphor would be too volatile to be incorporated with the spray dried particles.

An example of such a phosphor is a calcium halophosphate having the formula $Ca_{4.62}$ $Cd_{0.06}$ $F_{0.80}$ $Cl_{0.20}$ $(PO_4)_{3.00}$ $Sb_{0.06}$ $Mn_{0.10}$, which can be prepared by spray drying a solution containing the following materials: 4.62 mols $Ca(NO_3)_2$, 0.06 mols $Cd(NO_3)_2$, 0.10 mols $Mn(NO_3)_2$, 0.06 mols $SbF_3$, 0.80 mols HF and 3.00 mols $H_3PO_4$. Hydrogen chloride is added to the transport gas used to carry the spray dried powder to the flame jet. In the flame the hydrogen chloride enters directly into the reaction and the powder is converted into the above mentioned phosphor.

We claim:

1. The process of manufacturing a halophosphate or orthophosphate phosphor comprising the steps of: dissolving and/or dispersing predetermined amounts of phosphor-forming ingredients including calcium and/or strontium and/or barium compounds plus a phosphate-containing compound in a liquid; atomizing said liquid into droplets and drying said droplets to produce particles having a predetermined particle size range; transporting said particles into a flame and heating said particles therein to a temperature sufficient to react said ingredients to form a halophosphate or orthophosphate phosphor matrix.

2. The process of claim 1 wherein said particles are at least partially melted in said flame.

3. The process of claim 1 wherein said flame results from burning of a gaseous fuel.

4. The process of claim 3 including the step of at least partially mixing said particles with said gaseous fuel before said particles enter said flame.

5. The process of claim 4 including the step of introducing a combustion supporting gas to the mixture of particles and fuel by means of rotating nozzles.

6. The process of claim 1 including the step of introducing a volatile reactive species into said flame, said species reacting with said particles therein to form said phosphor matrix.

7. The process of manufacturing a halophosphate or orthophosphate phosphor comprising the steps of preparing a powder having a predetermined particle size range, said powder comprising phosphor-forming ingredients including calcium and/or strontium and/or barium compounds plus a phosphate-containing compound, and firing said powder in a flame jet sufficiently to react said ingredients to form a halophosphate or orthophosphate phosphor matrix.

8. The process of claim 7 wherein said powder is at least partially melted in said flame.

9. The process of manufacturing a halophosphate phosphor comprising the steps of: preparing a solution and/or dispersion including phosphoric acid, a nitrate of calcium and/or strontium and/or barium, a halide and an activating ingredient; atomizing said solution and/or dispersion into droplets and drying said droplets to produce particles having a predetermined particle size range; transporting said particles into a flame and heating said particles therein to a temperature sufficient to form a halophosphate phosphor matrix.

10. The process of claim 9 including the step of activating said phosphor matrix by a subsequent firing thereof.

* * * * *